US008780826B2

(12) United States Patent
Xu et al.

(10) Patent No.: US 8,780,826 B2
(45) Date of Patent: Jul. 15, 2014

(54) CONTINUOUS CDM/FDM STRUCTURE FOR LTE UPLINK DATA

(75) Inventors: Hao Xu, San Diego, CA (US); Durga Prasad Malladi, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 13/004,738

(22) Filed: Jan. 11, 2011

(65) Prior Publication Data

US 2011/0170504 A1 Jul. 14, 2011

Related U.S. Application Data

(60) Provisional application No. 61/294,417, filed on Jan. 12, 2010.

(51) Int. Cl.
*H04W 4/00* (2009.01)
(52) U.S. Cl.
USPC .......................................................... 370/329
(58) Field of Classification Search
USPC ......... 370/203, 208, 206, 281, 329, 344, 275, 370/338, 335, 343, 480; 375/260, 267, 295
See application file for complete search history.

(56) References Cited

U.S. PATENT DOCUMENTS

| 6,347,234 | B1 * | 2/2002 | Scherzer ..................... 455/562.1 |
| 7,974,177 | B2 * | 7/2011 | Ofuji et al. ..................... 370/203 |
| 2007/0133458 | A1 | 6/2007 | Chandra et al. |
| 2008/0049668 | A1 * | 2/2008 | Kakura et al. ................ 370/329 |
| 2008/0080467 | A1 * | 4/2008 | Pajukoski et al. ............ 370/342 |
| 2008/0080472 | A1 | 4/2008 | Bertrand et al. |
| 2008/0225788 | A1 * | 9/2008 | Inoue et al. ................... 370/329 |
| 2008/0267157 | A1 * | 10/2008 | Lee et al. ....................... 370/342 |
| 2009/0257408 | A1 * | 10/2009 | Zhang et al. .................. 370/336 |
| 2009/0316626 | A1 | 12/2009 | Lee et al. |
| 2010/0002655 | A1 * | 1/2010 | Ofuji et al. .................... 370/335 |
| 2010/0046451 | A1 | 2/2010 | Tada et al. |
| 2010/0118855 | A1 * | 5/2010 | Malladi ........................ 370/342 |
| 2010/0169732 | A1 | 7/2010 | Wu |
| 2012/0127950 | A1 * | 5/2012 | Chung et al. .................. 370/329 |
| 2012/0243497 | A1 * | 9/2012 | Chung et al. .................. 370/329 |

FOREIGN PATENT DOCUMENTS

| EP | 2104239 A1 | 9/2009 |
| JP | 2002111631 A | 4/2002 |
| JP | 2008172374 A | 7/2008 |
| JP | 2009111780 A | 5/2009 |
| JP | 2010193425 A | 9/2010 |
| JP | 2011035844 A | 2/2011 |

(Continued)

OTHER PUBLICATIONS

International Search Report and Written Opinion—PCT/US2011/021021—ISA/EPO—May 27, 2011.

(Continued)

*Primary Examiner* — Abdullah Riyami
(74) *Attorney, Agent, or Firm* — Paul Kuo

(57) ABSTRACT

A method, an apparatus, and a computer program product for wireless communication are provided in which information regarding use of a CDM and FDM structure for multiplexing data on a data channel for uplink for at least one subframe is determined. In addition, the data is multiplexed using the CDM/FDM structure for the at least one subframe based on the determined information.

38 Claims, 20 Drawing Sheets

(56) References Cited

FOREIGN PATENT DOCUMENTS

| WO | 2006134946 A1 | 12/2006 |
| WO | 2008054650 A2 | 5/2008 |
| WO | WO2008057836 | 5/2008 |
| WO | 2008096527 A1 | 8/2008 |
| WO | 2008133981 A1 | 11/2008 |
| WO | WO2009088172 A2 | 7/2009 |

OTHER PUBLICATIONS

Susitaival, Riikka, et al., "LTE Coverage Improvement by TTI Bundling", Vehicular Technology Conference—VTC, 2009.

Kim, Yong-Seok, "An Efficient Scheduling Scheme to Enhance the Capacity of VoIP Services in Evolved UTRA Uplink", EURASIP Journal on Wireless Communications and Networking, vol. 2008, Article ID 732418, 9 pages Hindawi Publishing Corporation, doi:10.1155/2008/732418.

Han, Jing, "Principle and Performance of TTI Bundling for VoIP in LTE FDD Mode", Published in IEEE Wireless Communications and Networking Conference, Apr. 5-8, 2009, pp. 1-6.

Wang, Haiming, et al., "Performance of TTI Bundling for VoIP in EUTRAN TDD Mode", Published IEEE 69th Vehicular Technology Conference, Apr. 26-29, 2009, pp. 1-5.

3rd Generation Partnership Project; Technical Specification Group Radio Access Network; Evolved Universal Terrestrial Radio Access (E-UTRA); Physical layer procedures (Release 8), 3GPP TS 36.211 V8.3.0, May 2008.

Alcatel-Lucent: "Performance Comparison of Solutions for Subframe Bundling", 3GPP TSG-RAN WG1#52 R1-080913, Feb. 11, 2008.

\* cited by examiner

US 8,780,826 B2

CONTINUOUS CDM/FDM STRUCTURE FOR LTE UPLINK DATA

CROSS-REFERENCE TO RELATED APPLICATION(S)

This application claims the benefit of U.S. Provisional Application Ser. No. 61/294,417, entitled "Systems, Apparatus and Methods to Facilitate Voice Over Internet Protocol in Long-Term Evolution Systems," filed on Jan. 12, 2010, which is expressly incorporated by reference herein in its entirety.

BACKGROUND

1. Field

The present disclosure relates generally to communication systems, and more particularly, to continuous code divisional multiplexing (CDM) and frequency division multiplexing (FDM) structure for Long Term Evolution (LTE) uplink (UL) data.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the UL, and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, an apparatus, and a computer program product for wireless communication are provided in which information regarding use of a CDM and FDM structure for multiplexing data on a data channel for uplink for at least one subframe is determined. In addition, the data is multiplexed using the CDM/FDM structure for the at least one subframe based on the determined information.

DETAILED DESCRIPTION

Figure 1:
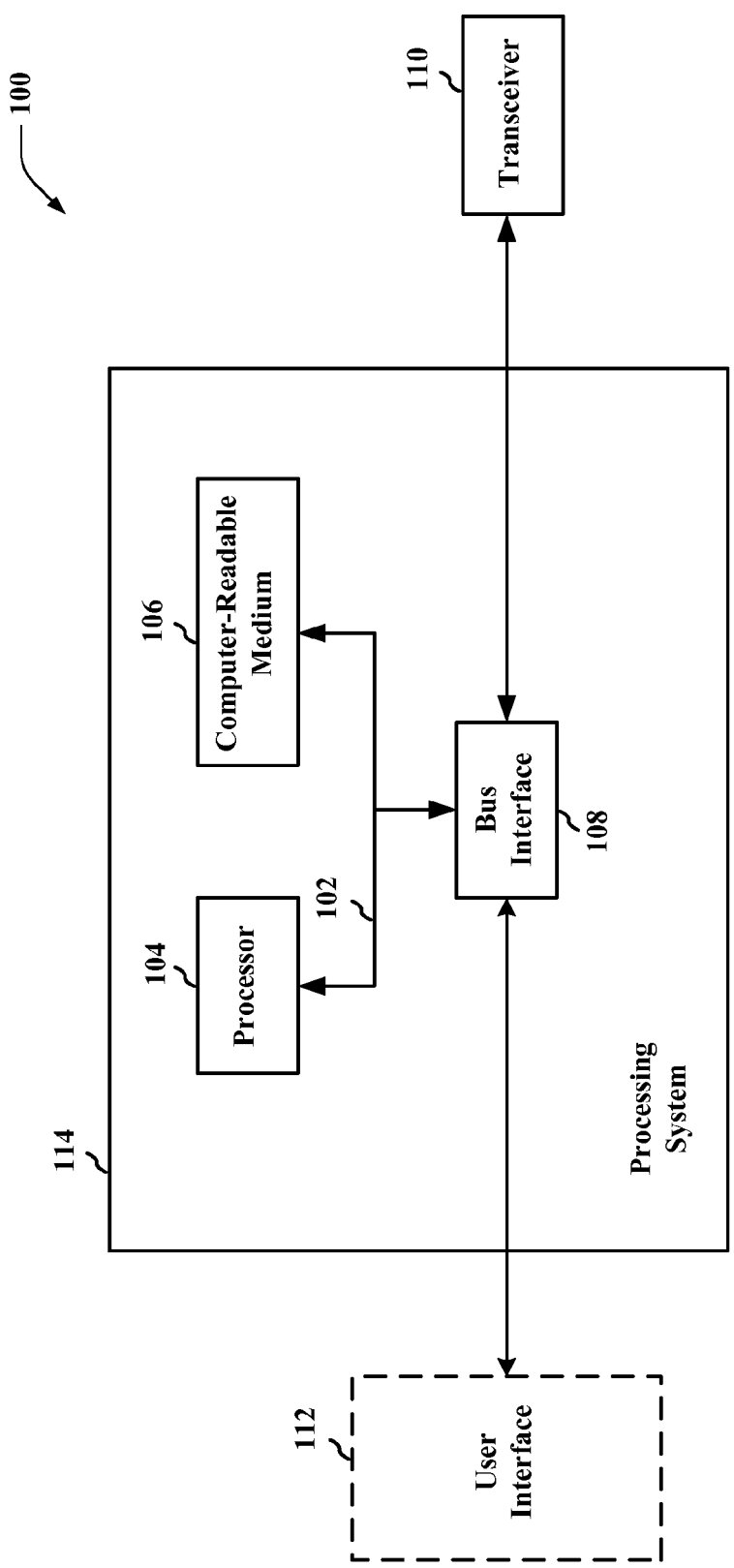
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
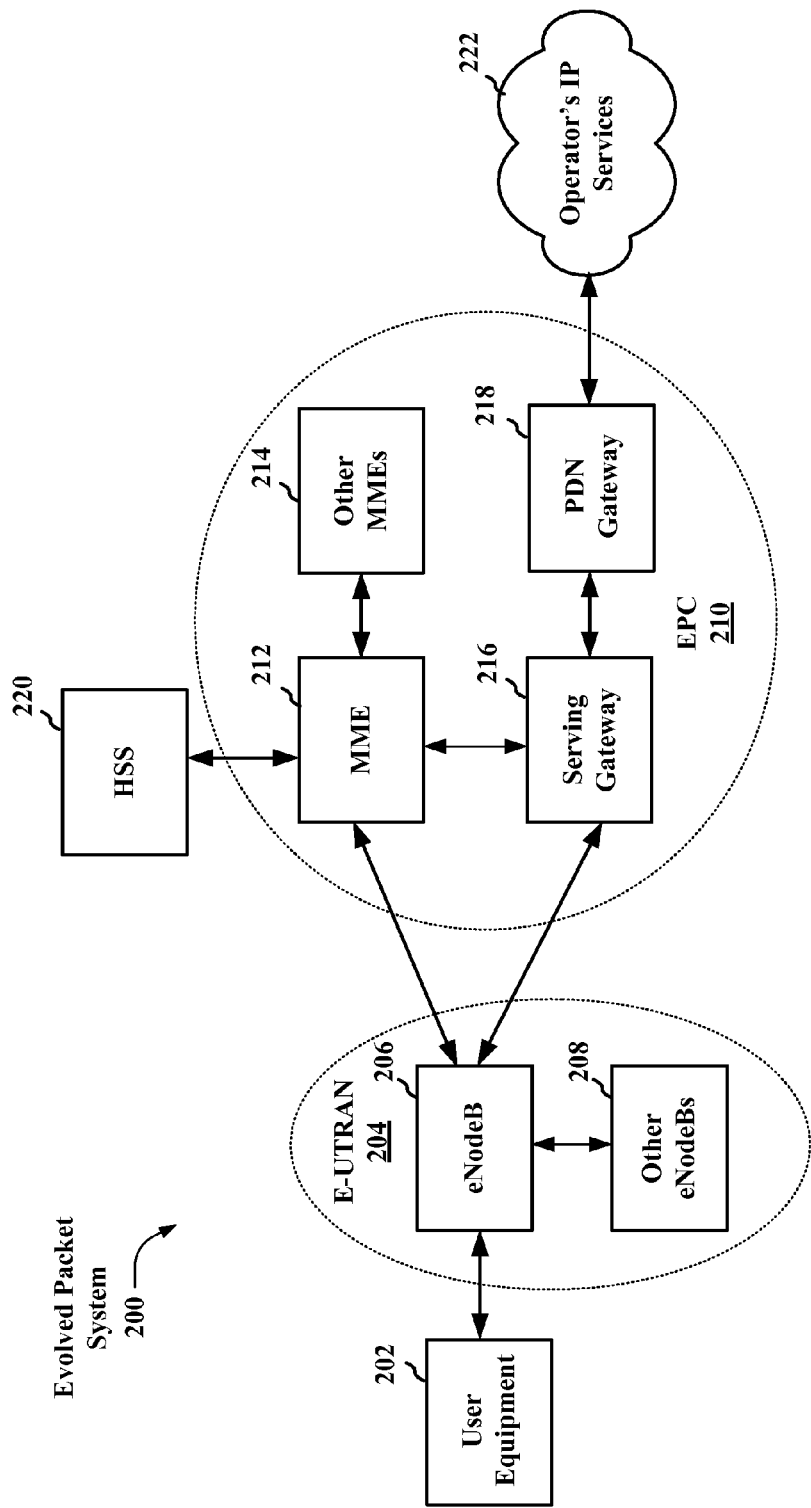
FIG. 2 is a diagram illustrating an example of a network architecture.

FIG. 2 is a diagram illustrating an LTE network architecture 200 employing various apparatuses 100 (See FIG. 1). The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 3:
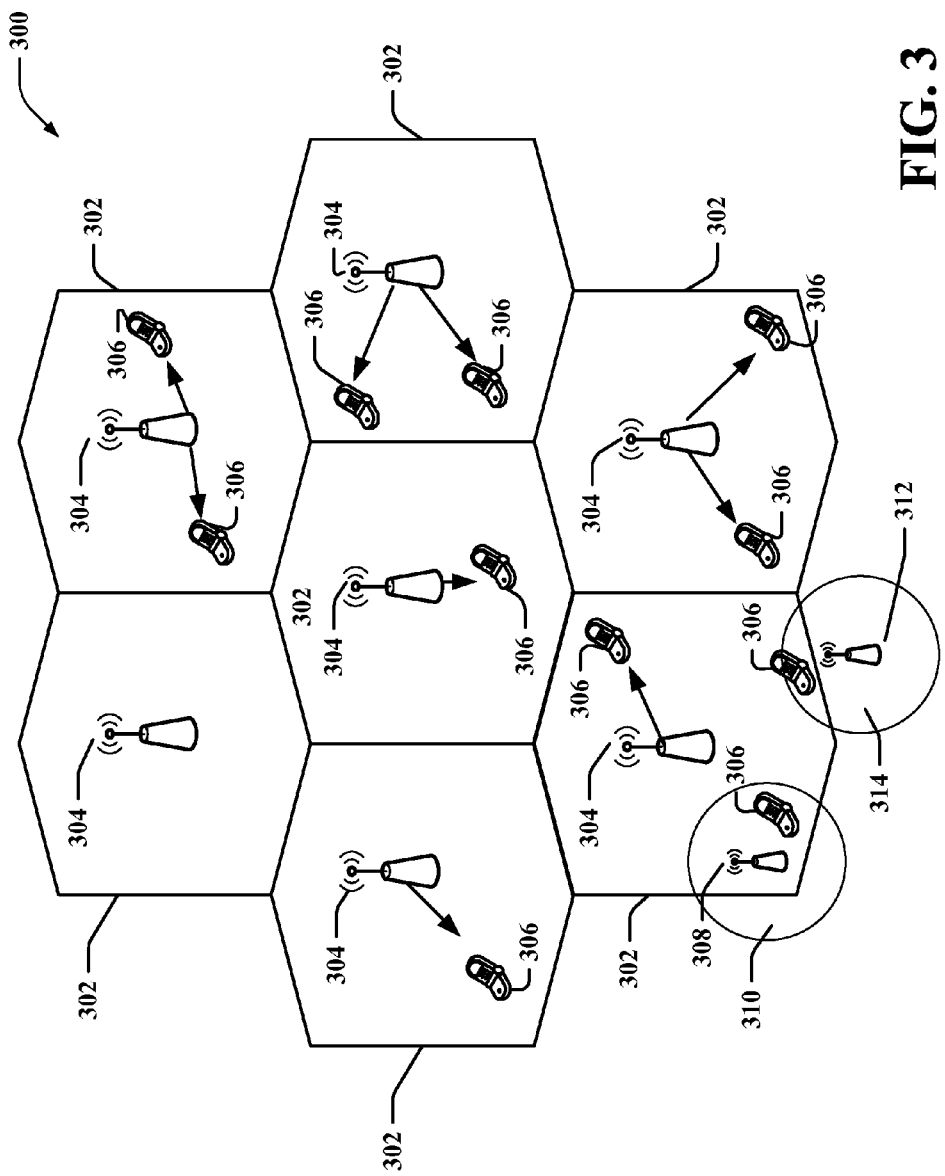
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
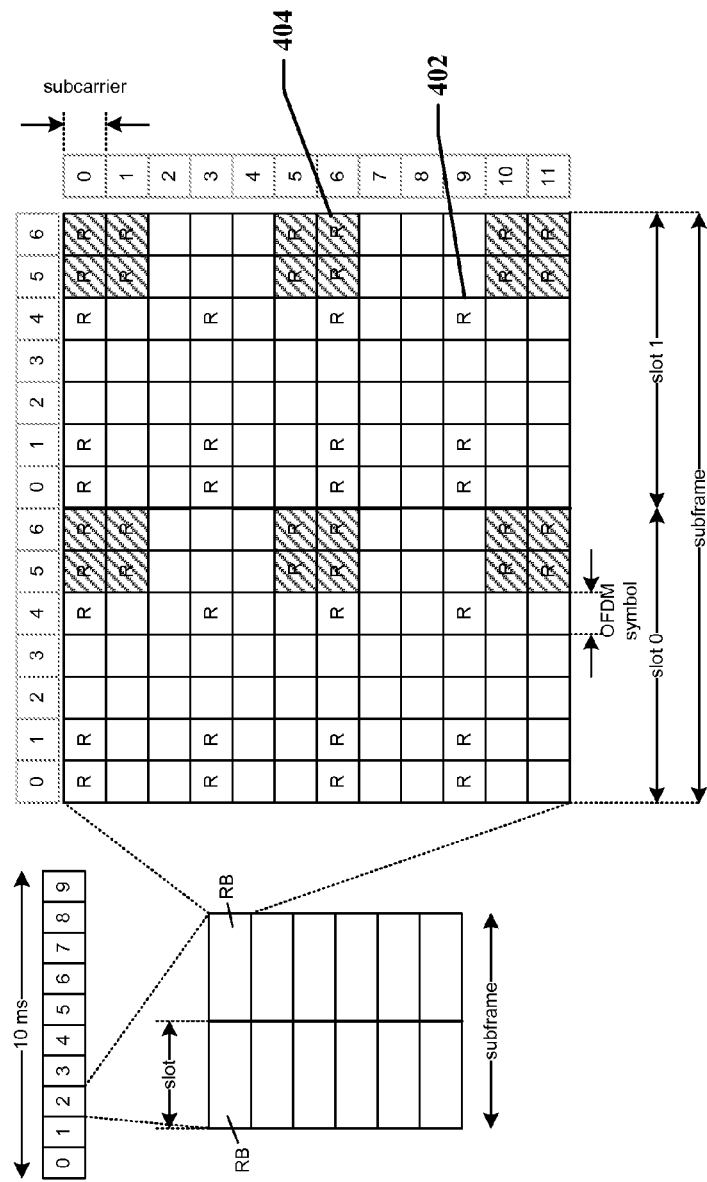
FIG. 4 is a diagram illustrating an example of a DL frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized subframes. Each subframe includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include DL reference signals (DL-RS). The DL-RS include Cell-specific RS (CRS) (also sometimes called common RS) 402 and UE-specific RS (UE-RS) 404. UE-RS 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
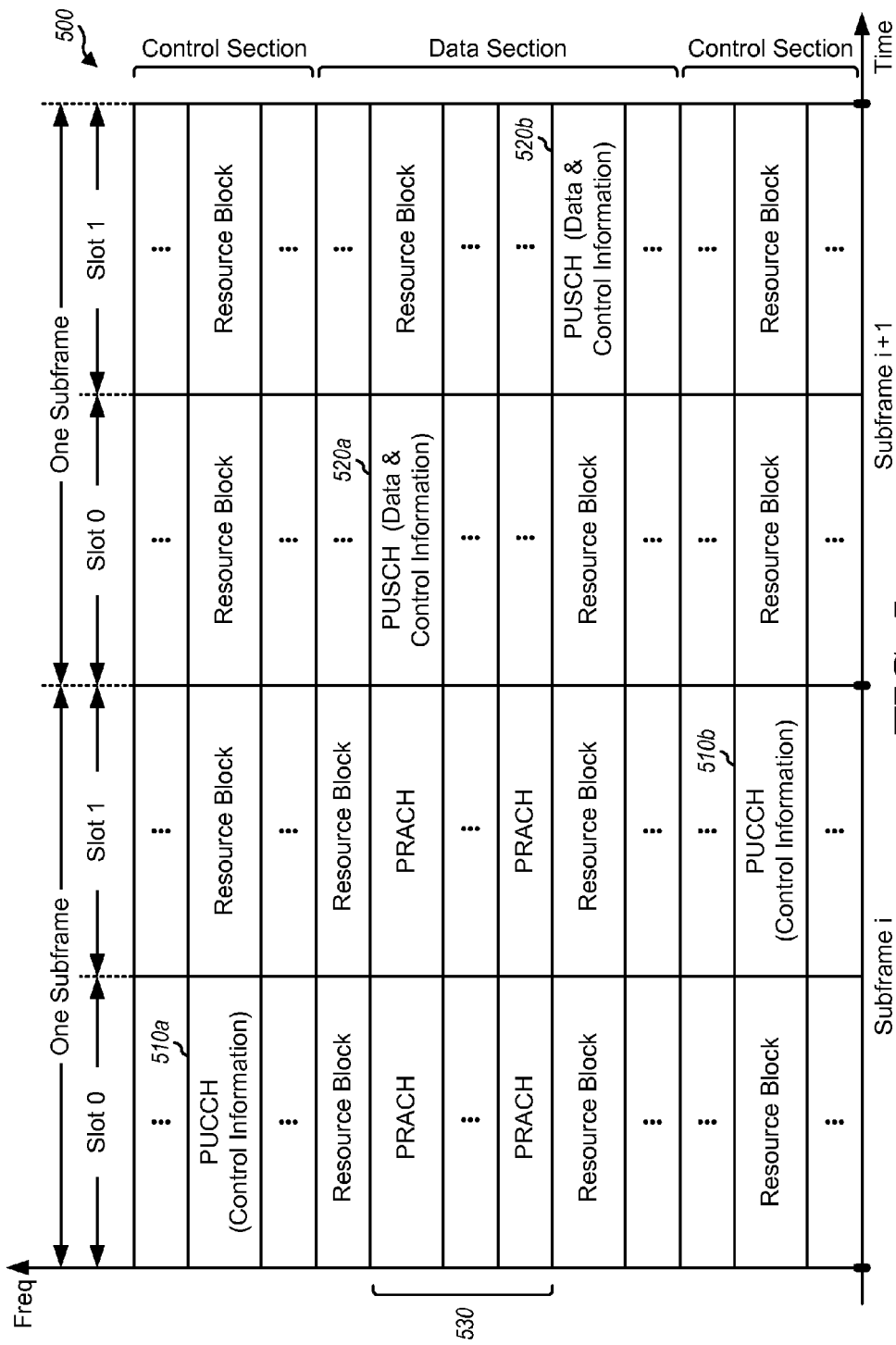
FIG. 5 shows an exemplary format for the UL in LTE.

An example of a UL frame structure 500 will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 5.

As shown in FIG. 5, a set of resource blocks may be used to perform initial system access and achieve UL synchronization in a physical random access channel (PRACH) 530. The PRACH 530 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

Figure 6:
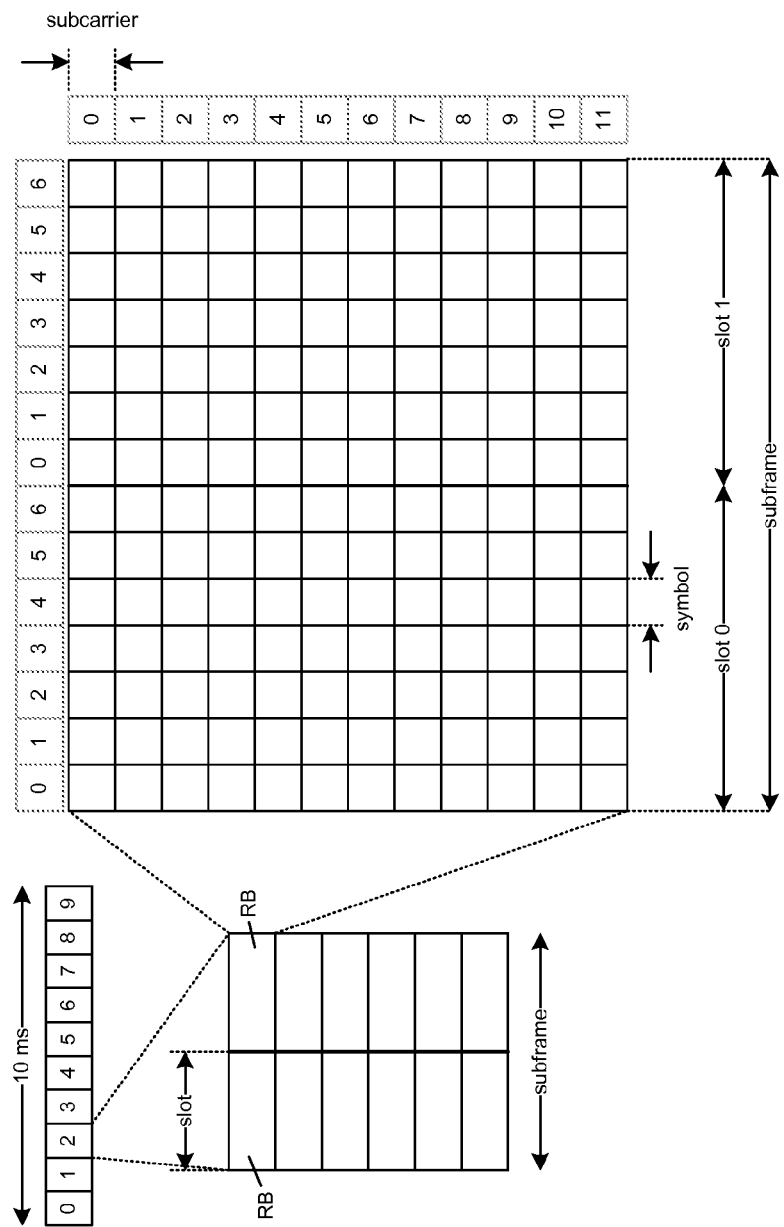
FIG. 6 is a diagram illustrating an example of an UL frame structure for use in an access network.

FIG. 6 is a diagram illustrating an example of an UL frame structure for use in an access network. As shown in FIG. 6, a frame (10 ms) includes 10 subframes. Each subframe includes two consecutive time slots. Each slot includes a resource block. Each resource block contains 12 consecutive subcarriers in the frequency domain and, for a normal cyclic prefix in each OFDM symbol, 7 consecutive symbols in the time domain. Assuming a normal cyclic prefix, for the PUCCH HARQ-ACK/NACK and scheduling requests (format 1, 1a, and 1b), the reference signals are on symbols 2-4; for the PUCCH channel quality indicator (CQI), precoding matrix indicator (PMI), and rank index (RI) (format 2, 2a, 2b), the reference signals are on symbols 1 and 5; and for PUSCH, the reference signals are on symbol 3.

Figure 7:
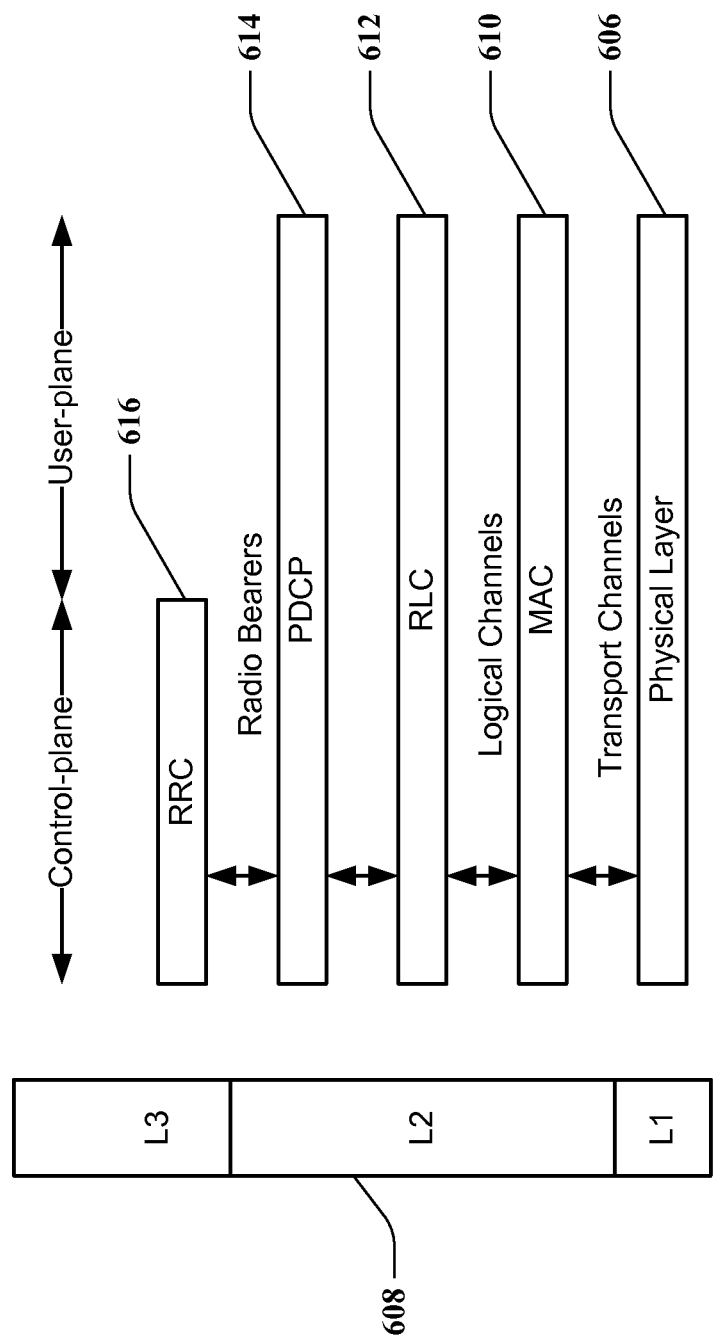
FIG. 7 is a diagram illustrating an example of a radio protocol architecture for the user and control plane.

The radio protocol architecture may take on various forms depending on the particular application. An example for an LTE system will now be presented with reference to FIG. 7. FIG. 7 is a conceptual diagram illustrating an example of the radio protocol architecture for the user and control planes.

Turning to FIG. 7, the radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 8:
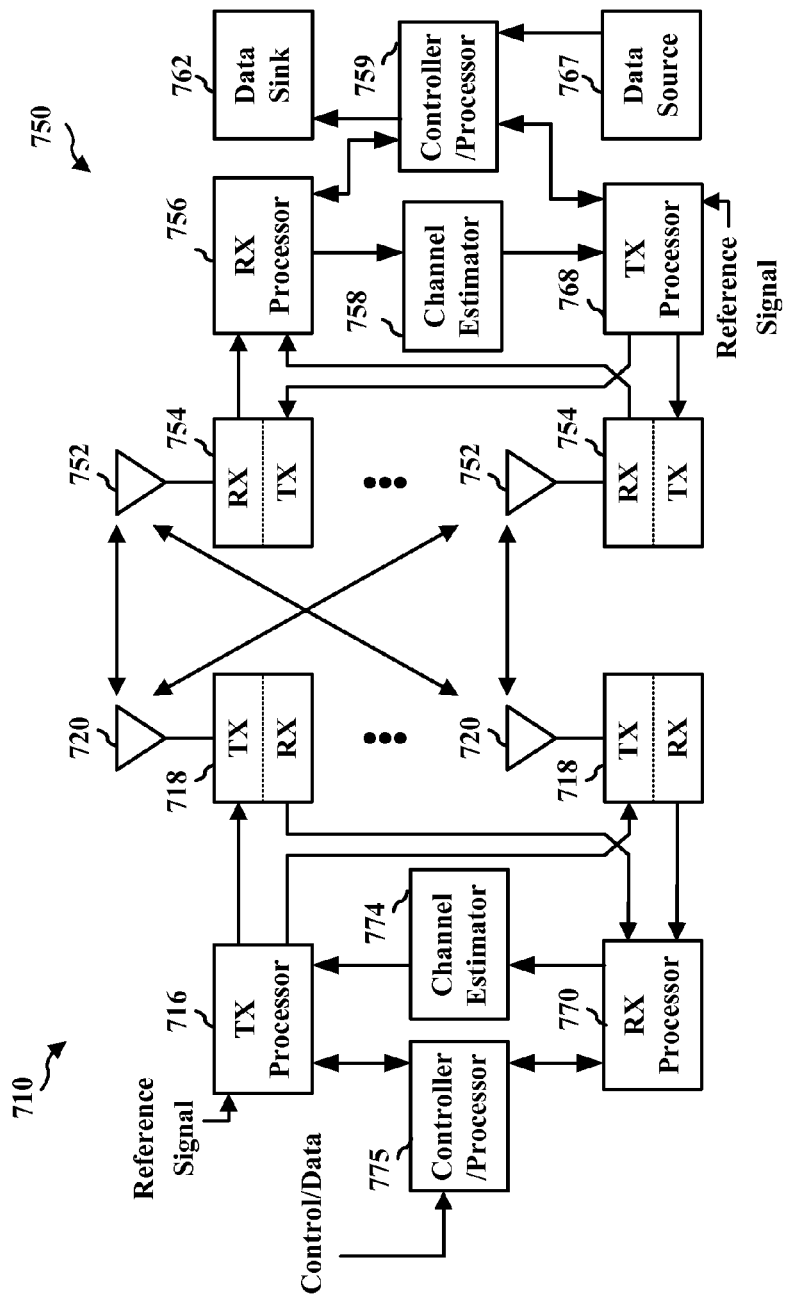
FIG. 8 is a diagram illustrating an example of an evolved Node B and user equipment in an access network.

FIG. 8 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 7. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 7. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 7. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an ACK and/or NACK protocol to support HARQ operations. The processing system 114 described in relation to FIG. 1 includes the UE 750. In particular, the processing system 114 includes the TX processor 768, the RX processor 756, and the controller/processor 759.

Figure 9:
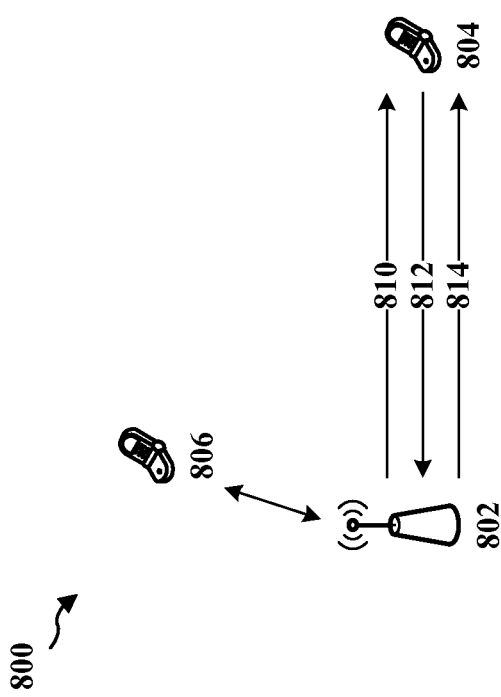
FIG. 9 is a diagram illustrating a base station and a UE in wireless wide area network (WWAN) communication.

FIG. 9 is a diagram 800 for illustrating an exemplary method. As shown in FIG. 9, the base station 802 is in WWAN communication with the UE 804 and the UE 806. According to the exemplary method, the UE 804 receives information 810 from the base station 802 regarding the use of a CDM and FDM structure for multiplexing the data on a data channel for UL (e.g., PUSCH) for at least one subframe. The information may be received through RRC signaling. The UE 804 multiplexes the data using the CDM/FDM structure for the at least one subframe based on the determined information. The UE 804 sends/transmits the data 812 in the at least one subframe to the base station 802. In response, the UE 804 may receive an HARQ-ACK/NACK 814 on the physical HARQ indicator channel (PHICH) from the base station 802. The HARQ-ACK/NACK may be received four subframes after the transmission in the at least one subframe.

The data 812 may be voice over Internet protocol (VoIP) data or otherwise small size bursty traffic, such as gaming data. The few bits of bursty traffic may be multiplexed onto the same resource block as other UEs such as the UE 806 using CDM/FDM. The small size allows multiple UEs, such as the UE 804 and the UE 806, to be mixed on the same resource block.

Figure 10:
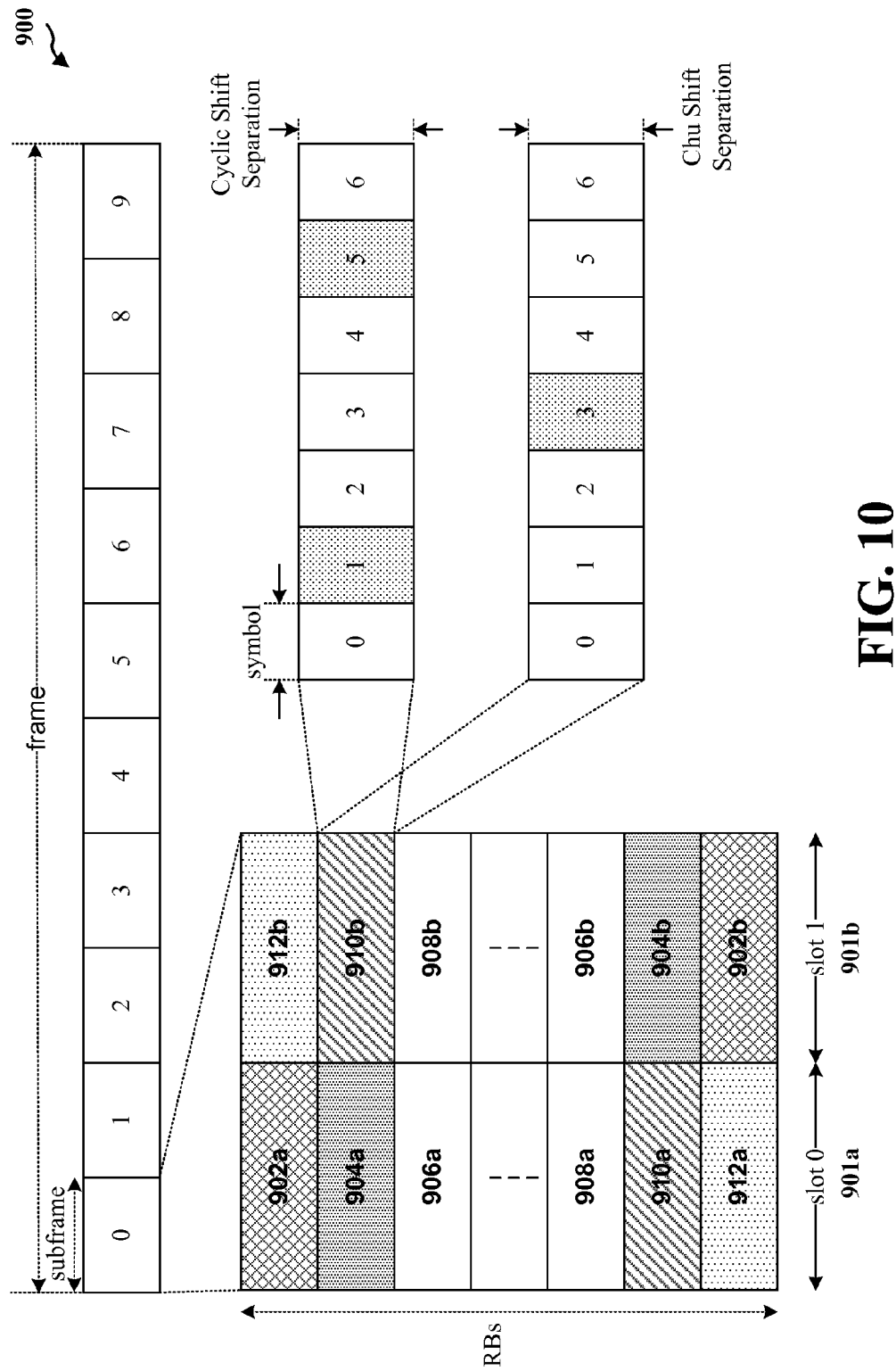
FIG. 10 is a diagram for illustrating an exemplary method.

FIG. 10 is a diagram 900 for illustrating the exemplary method. As shown in FIG. 10, a frame (10 ms) includes 10 subframes. Each subframe includes a first slot 901a and a second slot 901b. Each of the slots include a plurality of resource blocks. Slot 901a includes resource blocks 902a, 904a, 906a, 908a, 910a, 912a, and resource blocks between 906a and 908a. Slot 901b includes resource blocks 902b, 904b, 906b, 908b, 910b, 912b, and resource blocks between 906b and 908b. Each resource block may include six or seven symbols and twelve subcarriers (tones). In one configuration, the CDM/FDM structure used for multiplexing the data may be the same CDM/FDM structure used for transmitting CQI, PMI, and RI. In such a configuration, the data may be multiplexed onto a resource block using at least one of a Zadoff-Chu sequence or computer generated sequence (CGS). The Zadoff-Chu sequence is a complex-valued mathematical sequence that keeps cyclicly shifted versions of the sequence including the signal from cross-correlating with other signals when recovered at the receiver of the UE 802. As such, the data may be multiplexed onto the resource blocks 910a, 910b using a Zadoff-Chu sequence or CGS. On the resource blocks 910a, 910b, reference signals may be mapped to symbols 1 and 5, while the data may be mapped to symbols 0, 2-4, and 6. Each of the resource blocks may have a cyclic shift separation to limit interference. In another configuration, the CDM/FDM structure is different from a CDM/FDM structure used for transmitting CQI, PMI, and RI. When the CDM/FDM structure for transmitting CQI/PMI/RI is not used for transmitting PUSCH data, other CDM/FDM options can be used. That is, if the PUCCH structure for CQI/PMI/RI is not reused, the number of reference signals may be selected based on bundled transmissions. For example, assuming the data is multiplexed onto the resource blocks 910a, 910b, the data may be multiplexed onto a resource block using a pseudo-random noise (PN) sequence, and on the resource blocks 910a, 910b, reference signals may be mapped to symbol 3, while the data may be mapped to symbols 0-2 and 4-6. Each of the resource blocks may have a Chu shift separation to limit interference.

The resource blocks used for the data transmission may be semi-statically configured, such as through RRC signaling, or dynamically configured. The data may be mapped to resource blocks on any subset of a physical UL channel. For example, the physical UL channel may be both the PUCCH and the PUSCH. In such a configuration, the data may be mapped to any of the resource blocks 902a-912a and 902b-912. In another configuration, the physical UL channel is the PUSCH. In such a configuration, the PUCCH is mapped to resource blocks at the edges of the resources, such as resource blocks 902a, 902b and 912a, 912b, and the data are mapped to resource blocks between the PUCCH. In another configuration, the center resource blocks (e.g., resource blocks 906a, 906b, 908a, 908b, and between) of the resources are used for PUSCH information and the data are mapped to resource blocks adjacent resource blocks carrying PUCCH information, between the resource blocks carrying PUCCH information and resource blocks carrying PUSCH information (e.g., resource blocks 904a, 904b and 910a, 910b). In one configuration, the data are transmission time interval (TTI) bundled VoIP data and the PUSCH information includes at least one of non-bundled VoIP data or best effort (BE) data.

Figure 11:
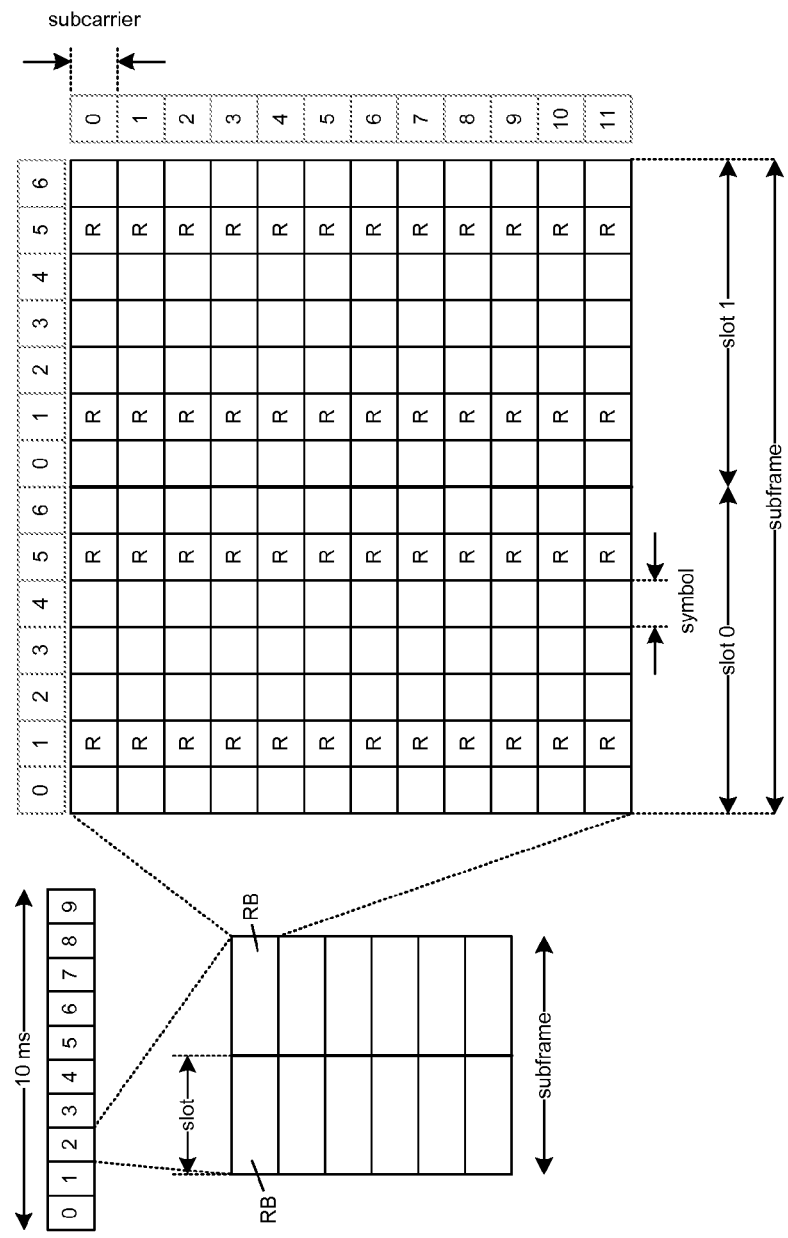
FIG. 11 is a diagram illustrating a first UL frame structure.

FIG. 11 is a diagram illustrating a first UL frame structure. The CDM/FDM structure used for multiplexing the data may be the same CDM/FDM structure used for transmitting CQI, PMI, and RI. As such, as shown in FIG. 11, on each of the reference blocks within a subframe, reference signals may be mapped to symbols 1 and 5, while the data may be mapped to symbols 0, 2-4, and 6.

Figure 12:
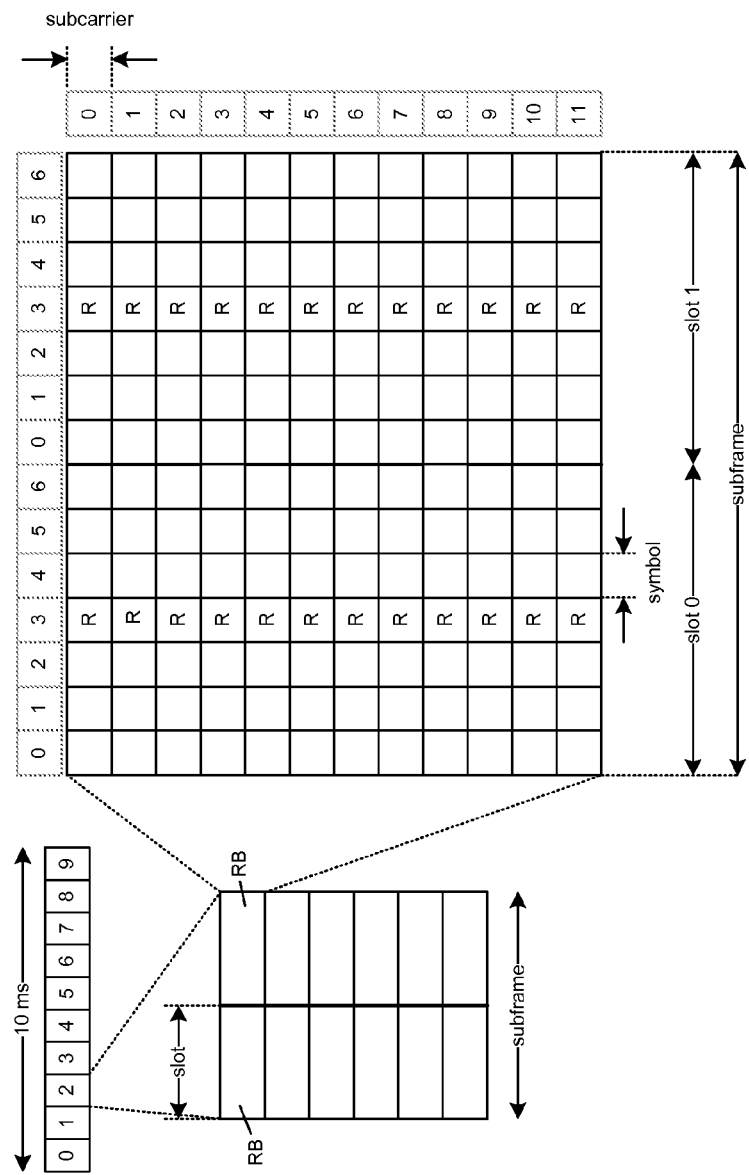
FIG. 12 is a diagram illustrating a second UL frame structure.

FIG. 12 is a diagram illustrating a second UL frame structure. The CDM/FDM structure used for multiplexing the data may be different from the CDM/FDM structure used for transmitting CQI, PMI, and RI. For example, the frame structure may be the same as that used for PUSCH. As such, as shown in FIG. 12, on each of the reference blocks within a subframe, reference signals may be mapped to symbol 3, while the data may be mapped to symbols 0-2 and 4-6.

Figure 13:
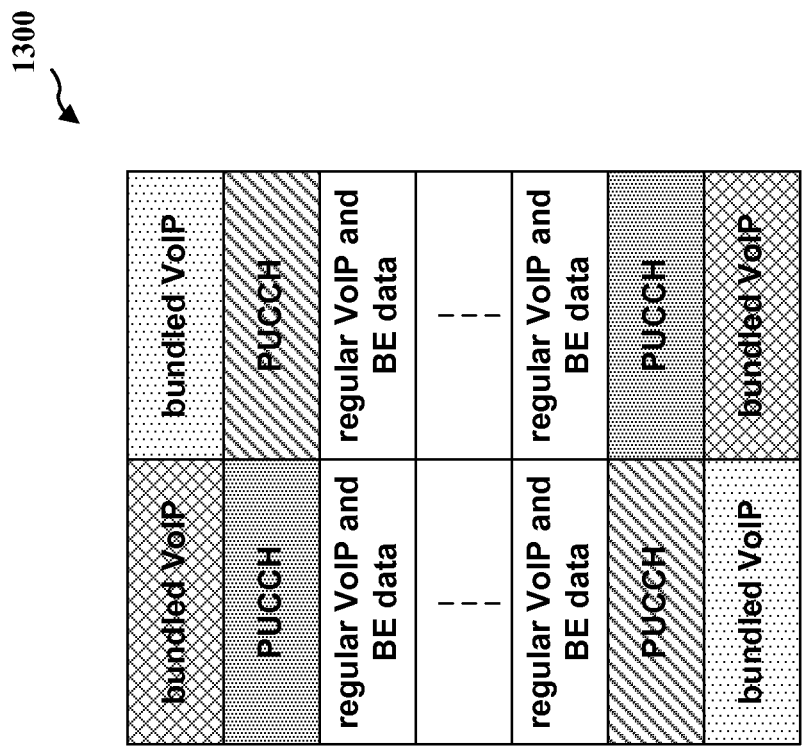
FIG. 13 is a first diagram illustrating FDM partitioning of different types of data.

FIG. 13 is a diagram 1300 illustrating FDM partitioning of different types of data. As shown in FIG. 13, the bundled and CDM multiplexed VoIP data may be partitioned at the edges of the resources, with PUCCH partitioned adjacent and between the bundled and CDM multiplexed VoIP data, and the remaining PUSCH data, including regular VoIP data and BE data, multiplexed between the PUCCH.

Figure 14:
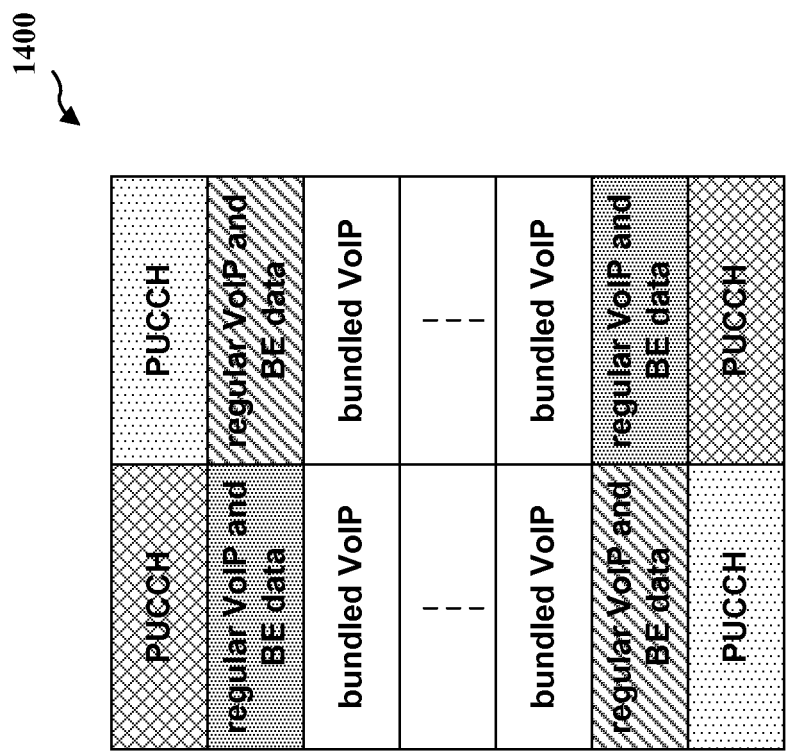
FIG. 14 is a second diagram illustrating FDM partitioning of different types of data.

FIG. 14 is a diagram 1400 illustrating FDM partitioning of different types of data. As shown in FIG. 14, the PUCCH may be partitioned at the edges of the resources, with the PUSCH data, including regular VoIP data and BE data, multiplexed adjacent and between the PUCCH, and the bundled and CDM multiplexed VoIP data multiplexed between the regular VoIP data and BE data.

Figure 15:
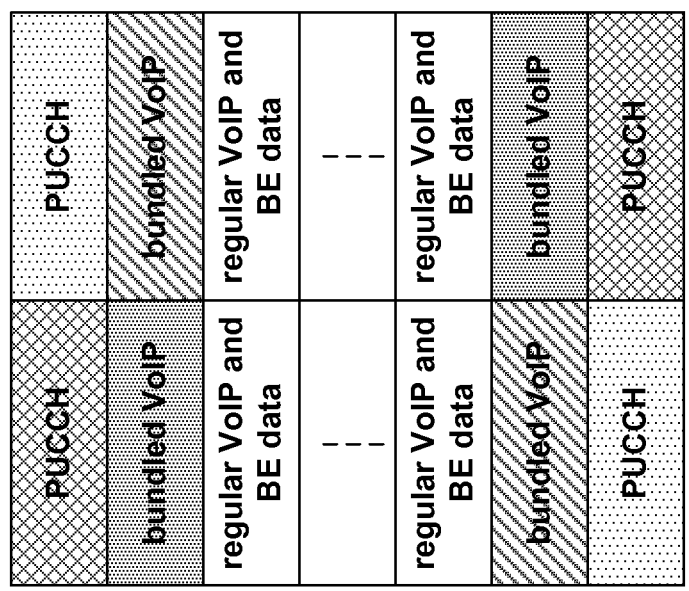
FIG. 15 is a third diagram illustrating FDM partitioning of different types of data.

FIG. 15 is a diagram 1500 illustrating FDM partitioning of different types of data. As shown in FIG. 15, the PUCCH may be partitioned at the edges of the resources, with the bundled and CDM multiplexed VoIP data partitioned adjacent and between the PUCCH, and the remaining PUSCH data, including regular VoIP data and BE data, multiplexed between the bundled and CDM multiplexed VoIP data.

In LTE Rel-8 and LTE Rel-9, time division multiplexing (TDM) is used for data transmission. Different HARQ processes are assigned to different UEs. For example, each UE can be assigned one out of eight HARQ processes and transmit every 8 ms. The minimum frequency domain assignment is one resource block (i.e., 12 resource elements). As such, only one UE is multiplexed onto each resource block. For UL data transmissions, the data channel is based on discrete Fourier transform (DFT) spread based localized frequency division multiplexing (LFDM) transmission. For UL control transmissions, the control channel is based on FDM/CDM multiplexing. Compared to other multiplexing schemes, such as CDMA, the TDM approach has a more stringent requirement for the link budget limited UEs. In CDM systems, a UE can continuously transmit in the time domain. As such, for a link budget limited UE with maximum a transmit power constraint, the energy can accumulate across subframes continuously. In contrast, in TDM systems such as LTE, if a UE is given one HARQ interlace out of a total of eight HARQ processes, the UE can transmit only once every 8 ms. So, if a UE is limited by the maximum transmit power, in order to accumulate the same amount of energy, the UE must transmit eight times longer than the UE would need to transmit in CDM systems.

The link budget constraint applies to only cell edge UEs with limited power headroom. If a UE is not limited by a transmit power constraint, the UE can always boost power per TDM transmission instead of spreading the transmit energy over time. Transmission over several TDM subframes has no performance impact if the application is not delay sensitive. However, for delay sensitive applications such as VoIP, there is a link budget constraint due to TDM. The link budget issue also limits VoIP capacity. TTI bundling for VoIP was designed to address the problem. In TTI bundling, several subframes are bundled together to transmit UL data. TTI bundling helps to solve the link budget issue, but due to the minimum one resource block assignment (i.e., only one UE multiplexed onto each resource block) and a maximum allowed bundling of four TTIs, there is still a link budget issue when the VoIP performance of LTE is compared with other CDM systems. In order to address the link budget issue, a new UL transmission scheme based on an FDM/CDM approach with bundled transmission is provided.

Figure 16:
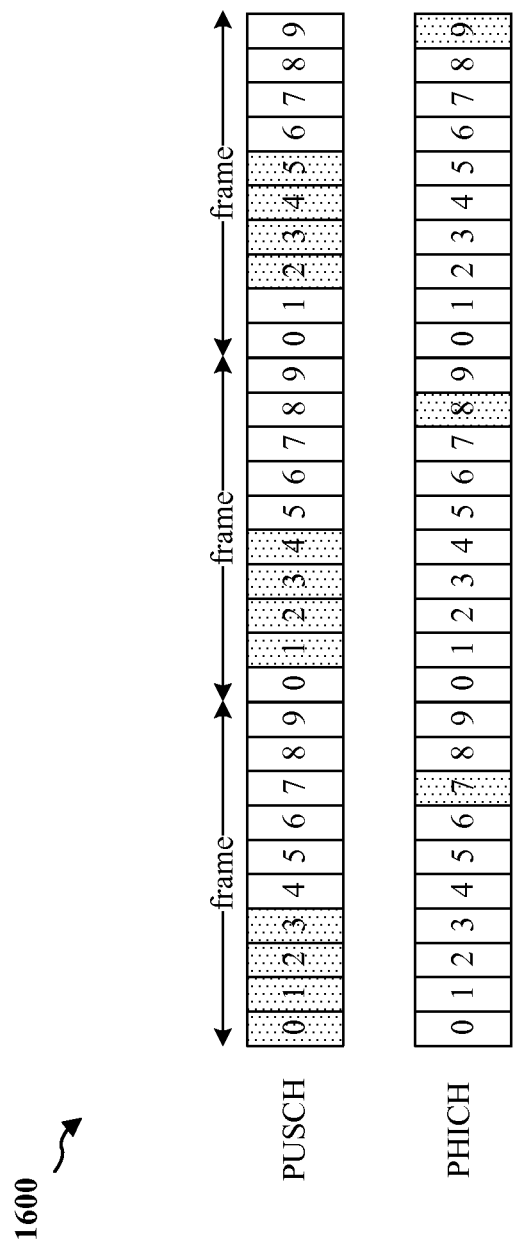
FIG. 16 is a first diagram for illustrating an exemplary transmission time interval (TTI) bundling.

FIG. 16 is a diagram 1300 for illustrating the exemplary method. As discussed supra, the data may be TTI bundled and CDM multiplexed VoIP data. An efficient technique for improving UL VoIP coverage at the cell edge is to use TTI bundling. In TTI bundling, at least one transport block from the MAC layer is transmitted repeatedly in multiple consecutive subframes, with only one set of signaling HARQ-ACK/NACK messages for the whole transmission. According to an exemplary method, the UE 802 TTI bundles at least four consecutive subframes by transmitting at least one transport block in each of the at least four consecutive subframes. In addition, the UE 802 maps the at least one transport block using CDM to a resource block on which at least one additional wireless device is multiplexed in each of the at least four consecutive subframes. Furthermore, the UE 802 transmits the at least one transport block on the resource block in each of the at least four consecutive subframes.

As shown in FIG. 13, subframes 0-3 of a first frame, subframes 1-4 of a second frame, and subframes 2-5 of a third frame are each TTI bundled by the UE 802. The VoIP data in each of the subframes 0-3 of the first frame, subframes 1-4 of the second frame, and subframes 2-5 of the third frame are multiplexed onto resource blocks using CDM. As such, data from other UEs are also multiplexed onto the same resource blocks. The UE 802 may receive the HARQ-ACK/NACK in the PHICH four subframes after the VoIP transmission, and therefore in subframe 7 in the first frame, subframe 8 in the second frame, and subframe 9 in the third frame. As the resource block spans twelve subcarriers, up to twelve UEs can be multiplexed on the same resource block with a Zadoff-Chu sequence or CGS separations. The VoIP packet may be turbo encoded instead of Reed-Muller (RM) coded and transmitted as shown in FIG. 16.

Figure 17:
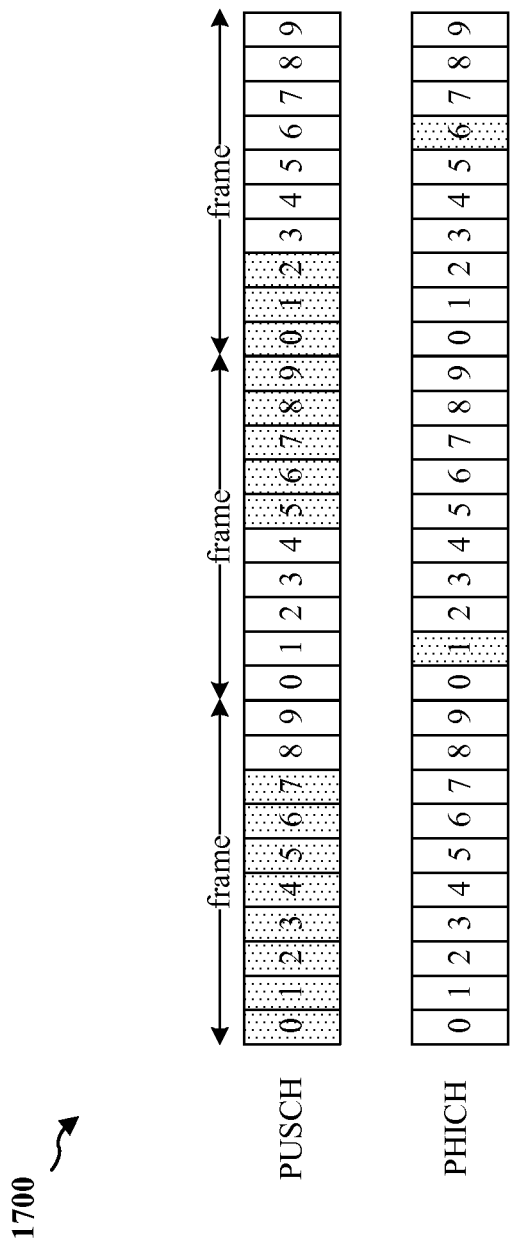
FIG. 17 is a second diagram for illustrating the exemplary TTI bundling.

FIG. 17 is a diagram 1400 for illustrating the exemplary method. As shown in FIG. 17, the UE 802 may TTI bundle more than four subframes, such as eight subframes. Subframes 0-7 of a first frame are TTI bundled by the UE 802 and subframes 5-9 of a second frame and subframes 0-2 of a third frame are TTI bundled by the UE 802. The VoIP data in each of the subframes are multiplexed onto resource blocks using CDM. As such, data from other UEs are also multiplexed onto the same resource blocks. The UE 802 may receive the HARQ-ACK/NACK in the PHICH four subframes after the VoIP transmission, and therefore in subframe 1 in the second frame and subframe 6 in the third frame. The VoIP packet may be turbo encoded instead of RM coded and transmitted as shown in FIG. 17.

The exemplary method impacts receiver algorithms. With the standard LTE UL channels, channel estimation is performed on a subframe basis. For link budget limited UEs, both channel estimation and interference estimation will suffer. However, with the exemplary method, inter subframe channel averaging or interpolation may further improve the link budget. As discussed supra, the resource partition between the bundled and CDM multiplexed VoIP data, regular VoIP data, and BE data may be semi-statically or dynamically allocated. The bundled and CDM multiplexed VoIP data may be required only for link budget limited UEs at the cell edge. As such, resources for the UEs may be dynamically allocated within the band (i.e., UL resources) based on whether the UEs are on the cell edge. The modulation and coding scheme (MCS) may be level 6 with a 328 bit payload for the cell edge. The adaptive multi rate (AMR) coding mode can be 12.2 kilobytes per second (kbps) with a 40-byte IPv4 header. The remaining bandwidth can be used for regular VoIP data and BE data. The MCS may be level 16 with a 328 bit payload for the cell center.

For example, referring again to FIG. 10, for the UEs on the cell edge, resource blocks 904a, 904b and/or 910a, 910b may be dynamically allocated for TTI bundled and CDM multiplexed VoIP data and the resource blocks 906a, 906b, 908a, 908b, and between may be dynamically allocated for regular VoIP data and BE data. However, for UEs in the cell center, the resource blocks 904a, 904b and/or 910a, 910b and between may be dynamically allocated for regular VoIP data and BE data. While specific resource blocks allocated for TTI bundled and CDM multiplexed VoIP data, regular VoIP data, and BE data were discussed in relation to the example above, as discussed supra, any resource blocks within the UL resources may be allocated to TTI bundled and CDM multiplexed VoIP data, regular VoIP data, and BE data.

An exemplary VoIP channel structure that is based on CDM/FDM UL transmission with TTI bundling has been provided. The structure is similar to a CDMA approach, where the UEs link budget is improved through continuous transmission and the UEs interference is limited by a Chu sequence separation. In one configuration, the PUCCH structure for CQI may be used. In such a configuration, the data may be turbo encoded across the bundled transmissions instead of RM coded per transmission. In another configuration, the PUCCH structure for CQI is not used. In such a configuration, the number of reference signals in the slot may be optimized to better match with the bundled transmissions. The bundled and CDM multiplexed VoIP transmission and other VoIP data and BE data transmissions may be FDM partitioned, either semi-statically or dynamically.

Figure 18:
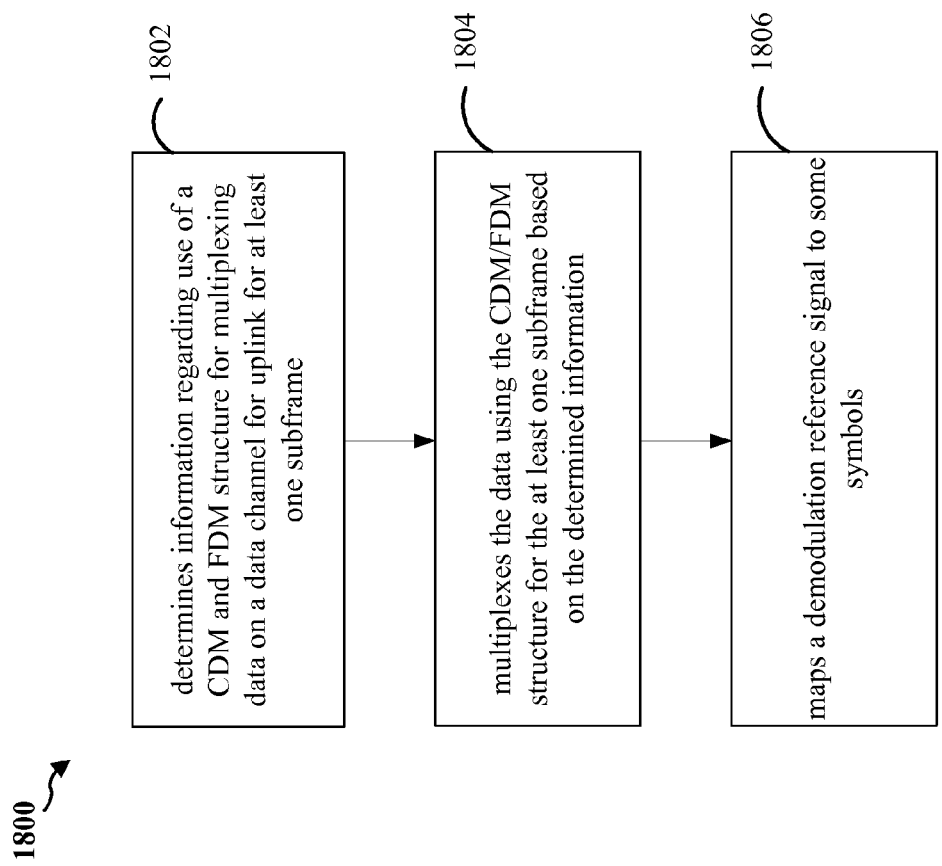
FIG. 18 is a flow chart of a method of wireless communication.

FIG. 18 is a flow chart 1800 of a method of wireless communication. The method is performed by a UE. In the method, the UE determines or receives (from a base station) information regarding use of a CDM and FDM structure for multiplexing data on a data channel for uplink for at least one subframe (1802). In addition, the UE multiplexes the data using the CDM/FDM structure for the at least one subframe based on the determined information (1804). The data may be voice over Internet protocol (VoIP) data or small size bursty traffic.

In one configuration, the CDM/FDM structure is different from a CDM/FDM structure used for transmitting CQI. In such a configuration, the data may be multiplexed onto a resource block using a PN sequence. In addition, each of the at least one subframe may include a first slot and a second slot. The first slot and the second slot each include a resource block of six symbols or seven symbols and twelve subcarriers. In one embodiment, when the resource block includes seven symbols, the UE maps a demodulation reference signal to the fourth symbol of each of the first slot and the second slot (1806). The data are mapped to at least one resource element of the first, second, third, fifth, sixth, and seventh symbols of each of the first slot and the second slot.

In another configuration, the CDM/FDM structure is the same as a CDM/FDM structure used for transmitting CQI. In such a configuration, the data may be multiplexed onto a resource block using at least one of a Zadoff-Chu sequence or a CGS. In addition, each of the at least one subframe may include a first slot and a second slot. The first slot and the second slot each include a resource block of six symbols or seven symbols and twelve subcarriers. In one embodiment, when the resource block includes seven symbols, the UE maps a demodulation reference signal to each of the second and sixth symbols of each of the first slot and the second slot (1806). The data are mapped to at least one resource element of the first, third, fourth, fifth, and seventh symbols of each of the first slot and the second slot.

The data may be mapped to resource blocks on a subset of a physical uplink channel. In one configuration, the data are mapped to resource blocks between resource blocks carrying PUCCH information. In one configuration, the data are mapped to resource blocks adjacent resource blocks carrying PUCCH information, between the resource blocks carrying PUCCH information and resource blocks carrying PUSCH information. In one configuration, the PUSCH information comprises at least one of non-bundled VoIP data or BE data.

Figure 19:
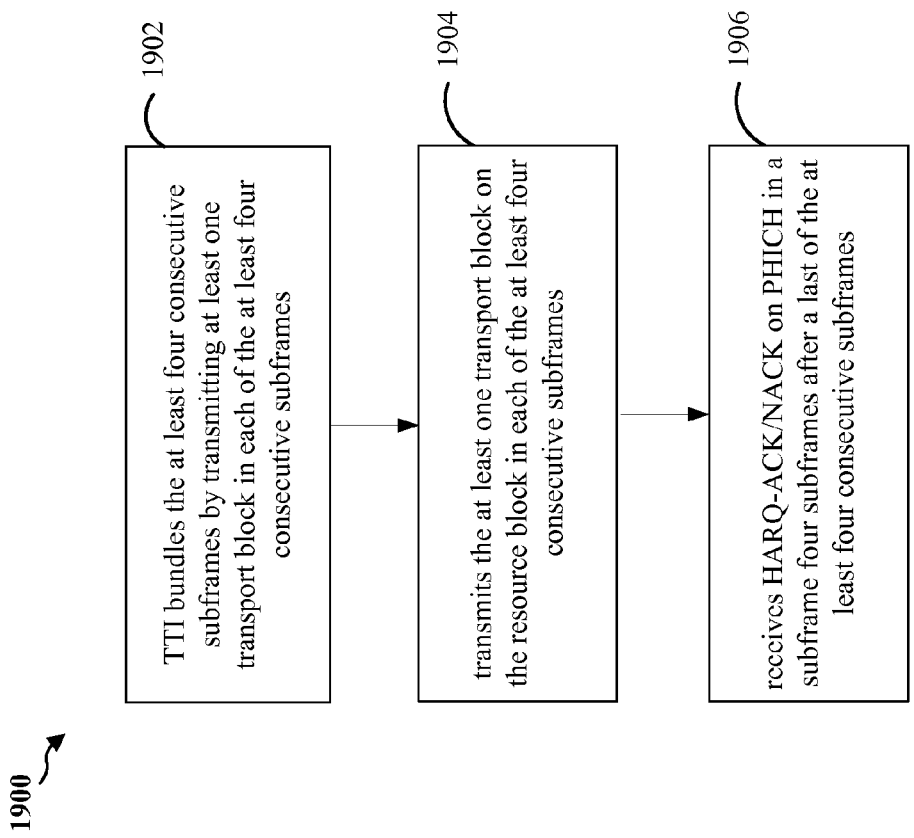
FIG. 19 is another flow chart of a method of wireless communication.

FIG. 19 is a flow chart 1900 of a method of wireless communication. In one configuration, the data is at least one transport block, the at least one subframe includes at least four consecutive subframes, and the UE multiplexes the data by multiplexing the at least one transport block on a resource block using CDM/FDM in each of the at least four consecutive subframes. In addition, the UE TTI bundles the at least four consecutive subframes by transmitting at least one transport block in each of the at least four consecutive subframes (1902). Furthermore, the UE transmits the at least one transport block on the resource block in each of the at least four consecutive subframes (1904). The at least four consecutive subframes may include four subframes. The at least four consecutive subframes may include eight subframes. In one configuration, the UE receives HARQ-ACK/NACK on the PHICH in a subframe four subframes after a last of the at least four consecutive subframes (1906). When the data are VoIP data, the UE may also turbo encode the VoIP data.

Figure 20:
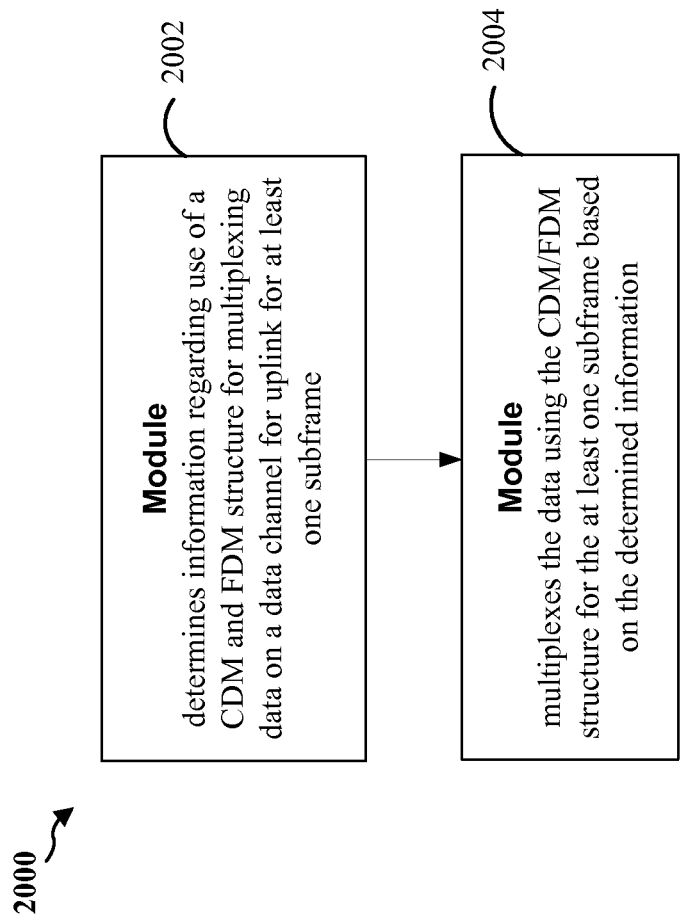
FIG. 20 is a conceptual block diagram illustrating the functionality of an exemplary apparatus.

FIG. 20 is a conceptual block diagram 2000 illustrating the functionality of an exemplary apparatus 100, which may be a UE. The apparatus 100 includes a module 2002 that determines or receives (from a base station) information regarding use of a CDM and FDM structure for multiplexing data on a data channel for uplink for at least one subframe. In addition, the apparatus 100 includes a module 2004 that multiplexes the data using the CDM/FDM structure for the at least one subframe based on the determined information.

In one configuration, the apparatus 100 for wireless communication includes means for determining information regarding use of a CDM and FDM structure for multiplexing data on a data channel for uplink for at least one subframe. In addition, the apparatus 100 includes means for multiplexing the data using the CDM/FDM structure for the at least one subframe based on the determined information. In one configuration, the apparatus 100 further includes means for mapping a demodulation reference signal to the fourth symbol of each of the first slot and the second slot. In such a configuration, the data are mapped to at least one resource element of the first, second, third, fifth, sixth, and seventh symbols of each of the first slot and the second slot. In one configuration, the apparatus 100 further includes means for mapping a demodulation reference signal to each of the second and sixth symbols of each of the first slot and the second slot. In such a configuration, the data are mapped to at least one resource element of the first, third, fourth, fifth, and seventh symbols of each of the first slot and the second slot. The means for multiplexing the data may include means for multiplexing the at least one transport block on a resource block using CDM/FDM in each of the at least four consecutive subframes. In such a configuration, the apparatus 100 may further include means for TTI bundling the at least four consecutive subframes by transmitting at least one transport block in each of the at least four consecutive subframes, and means for transmitting the at least one transport block on the resource block in each of the at least four consecutive subframes. The apparatus 100 may further include means for receiving an HARQ- ACK/NACK on the PHICH in a subframe four subframes after a last of the at least four consecutive subframes. When the data is VoIP data, the apparatus 100 may further include means for turbo encoding the VoIP data. The aforementioned means is the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   determining information regarding use of a code division multiplexing and frequency division multiplexing structure for multiplexing data comprising at least one transport block on a data channel for uplink for at least four consecutive subframes;
   multiplexing the data on the data channel for uplink in each of the at least four consecutive subframes using the code division multiplexing and frequency division multiplexing structure based on the determined information; and
   transmitting the at least one transport block in each of the at least four consecutive subframes.

2. The method of claim 1, wherein the data are voice over Internet protocol data or small size bursty traffic.

3. The method of claim 1, wherein the code division multiplexing and frequency division multiplexing structure is different from a code division multiplexing and frequency division multiplexing structure used for transmitting a channel quality indicator.

4. The method of claim 3, wherein the data are multiplexed onto a resource block using a pseudo-random noise sequence.

5. The method of claim 4, wherein each of the at least four subframes comprises a first slot and a second slot, the first slot and the second slot each comprising a resource block of six symbols or seven symbols and twelve subcarriers.

6. The method of claim 5, wherein the resource block comprises seven symbols, and the method further comprises mapping a demodulation reference signal to the fourth symbol of each of the first slot and the second slot, wherein the data are mapped to at least one resource element of the first, second, third, fifth, sixth, and seventh symbols of each of the first slot and the second slot.

7. The method of claim 1, wherein the code division multiplexing and frequency division multiplexing structure is the same as a code division multiplexing and frequency division multiplexing structure used for transmitting a channel quality indicator.

8. The method of claim 7, wherein the data are multiplexed onto a resource block using at least one of a Zadoff-Chu sequence or a computer generated sequence.

9. The method of claim 8, wherein each of the at least four subframes comprises a first slot and a second slot, the first slot and the second slot each comprising a resource block of six symbols or seven symbols and twelve subcarriers.

10. The method of claim 9, wherein the resource block comprises seven symbols, and the method further comprises mapping a demodulation reference signal to each of the second and sixth symbols of each of the first slot and the second slot, wherein the data are mapped to at least one resource element of the first, third, fourth, fifth, and seventh symbols of each of the first slot and the second slot.

11. The method of claim 1, wherein the data are mapped to resource blocks on a subset of a physical uplink channel.

12. The method of claim 11, wherein the data are mapped to resource blocks between resource blocks carrying physical uplink control channel information.

13. The method of claim 12, wherein the data are mapped to adjacent resource blocks carrying physical uplink control channel information, between the resource blocks carrying physical uplink control channel information and resource blocks carrying physical uplink shared channel information.

14. The method of claim 13, wherein the physical uplink shared channel information comprises at least one of non-bundled data or best effort data.

15. The method of claim 1, wherein the at least four consecutive subframes comprise four subframes.

16. The method of claim 1, wherein the at least four consecutive subframes comprise eight subframes.

17. The method of claim 1, further comprising receiving a hybrid automatic repeat request acknowledgement or negative acknowledgement on a physical hybrid automatic repeat request indicator channel in a subframe four subframes after a last of the at least four consecutive subframes.

18. The method of claim 1, wherein the data are voice over Internet protocol data, the method further comprising turbo encoding the voice over Internet protocol data.

19. An apparatus for wireless communication, comprising:
   means for determining information regarding use of a code division multiplexing and frequency division multiplexing structure for multiplexing data comprising at least one transport block on a data channel for uplink for at least four subframes;
   means for multiplexing the data on the data channel for uplink in each of the at least four consecutive subframes using the code division multiplexing and frequency division multiplexing structure based on the determined information; and
   means for transmitting the at least one transport block in each of the at least four consecutive subframes.

20. The apparatus of claim 19, wherein the data are voice over Internet protocol data or small size bursty traffic.

21. The apparatus of claim 19, wherein the code division multiplexing and frequency division multiplexing structure is different from a code division multiplexing and frequency division multiplexing structure used for transmitting a channel quality indicator.

22. The apparatus of claim 21, wherein the data are multiplexed onto a resource block using a pseudo-random noise sequence.

23. The apparatus of claim 22, wherein each of the at least four consecutive subframes comprises a first slot and a second slot, the first slot and the second slot each comprising a resource block of six symbols or seven symbols and twelve subcarriers.

24. The apparatus of claim 23, wherein the resource block comprises seven symbols, and the apparatus further comprises means for mapping a demodulation reference signal to the fourth symbol of each of the first slot and the second slot, wherein the data are mapped to at least one resource element of the first, second, third, fifth, sixth, and seventh symbols of each of the first slot and the second slot.

25. The apparatus of claim 19, wherein the code division multiplexing and frequency division multiplexing structure is the same as a code division multiplexing and frequency division multiplexing structure used for transmitting a channel quality indicator.

26. The apparatus of claim 25, wherein the data are multiplexed onto a resource block using at least one of a Zadoff-Chu sequence or a computer generated sequence.

27. The apparatus of claim 26, wherein each of the at least four consecutive subframes comprises a first slot and a second slot, the first slot and the second slot each comprising a resource block of six symbols or seven symbols and twelve subcarriers.

28. The apparatus of claim 27, wherein the resource block comprises seven symbols, and the apparatus further comprises means for mapping a demodulation reference signal to each of the second and sixth symbols of each of the first slot and the second slot, wherein the data are mapped to at least one resource element of the first, third, fourth, fifth, and seventh symbols of each of the first slot and the second slot.

29. The apparatus of claim 19, wherein the data are mapped to resource blocks on a subset of a physical uplink channel.

30. The apparatus of claim 29, wherein the data are mapped to resource blocks between resource blocks carrying physical uplink control channel information.

31. The apparatus of claim 30, wherein the data are mapped to adjacent resource blocks carrying physical uplink control channel information, between the resource blocks carrying physical uplink control channel information and resource blocks carrying physical uplink shared channel information.

32. The apparatus of claim 31, wherein the physical uplink shared channel information comprises at least one of non-bundled data or best effort data.

33. The apparatus of claim 19, wherein the at least four consecutive subframes comprise four subframes.

34. The apparatus of claim 19, wherein the at least four consecutive subframes comprise eight subframes.

35. The apparatus of claim 19, further comprising means for receiving a hybrid automatic repeat request acknowledgement or negative acknowledgement on a physical hybrid automatic repeat request indicator channel in a subframe four subframes after a last of the at least four consecutive subframes.

36. The apparatus of claim 19, wherein the data are voice over Internet protocol data, the apparatus further comprising means for turbo encoding the voice over Internet protocol data.

37. A computer program product, comprising:
a non-transitory computer-readable medium comprising code for:
determining information regarding use of a code division multiplexing and frequency division multiplexing structure for multiplexing data comprising at least one transport block on a data channel for uplink for at least four consecutive subframes;
multiplexing the data on the data channel for uplink in each of the at least four consecutive subframes using the code division multiplexing and frequency division multiplexing structure based on the determined information; and
transmitting the at least one transport block in each of the at least four consecutive subframes.

38. An apparatus for wireless communication, comprising:
a processing system configured to:
determine information regarding use of a code division multiplexing and frequency division multiplexing structure for multiplexing data comprising at least one transport block on a data channel for uplink for at least four consecutive subframes;
multiplex the data on the data channel for uplink in each of the at least four consecutive subframes using the code division multiplexing and frequency division multiplexing structure based on the determined information; and
transmitting the at least one transport block in each of the at least four consecutive subframes.

* * * * *